(12) United States Patent
Teirelbar et al.

(10) Patent No.: US 9,436,201 B1
(45) Date of Patent: Sep. 6, 2016

(54) SYSTEM AND METHOD FOR MAINTAINING A PHOTOVOLTAIC POWER SOURCE AT A MAXIMUM POWER POINT

(71) Applicant: KarmSolar, Cairo (EG)

(72) Inventors: Ahmed Teirelbar, Cairo (EG); Alia Morsi, Cairo (EG)

(73) Assignee: KarmSolar, Cairo (EG)

( * ) Notice: Subject to any disclaimer, the term of this patent is extended or adjusted under 35 U.S.C. 154(b) by 0 days.

(21) Appl. No.: 14/738,113

(22) Filed: Jun. 12, 2015

(51) Int. Cl.
*G01R 31/02* (2006.01)
*G05F 1/67* (2006.01)
*H02P 23/14* (2006.01)

(52) U.S. Cl.
CPC .............. *G05F 1/67* (2013.01); *H02P 23/14* (2013.01)

(58) Field of Classification Search
CPC .... G03B 7/08; Y02E 10/549; G01R 31/343; G01R 31/42
See application file for complete search history.

(56) References Cited

U.S. PATENT DOCUMENTS

| | | | |
|---|---|---|---|
| 4,060,426 A * | 11/1977 | Zinchuk | G03B 7/08 136/263 |
| 4,494,180 A | 1/1985 | Streater et al. | |
| 4,538,100 A | 8/1985 | Tuten et al. | |
| 4,872,100 A | 10/1989 | Diaz | |
| 4,939,633 A | 7/1990 | Rhodes et al. | |
| 4,999,560 A | 3/1991 | Morishima et al. | |
| 5,235,266 A | 8/1993 | Schaffrin | |
| 5,747,967 A | 5/1998 | Muljadi et al. | |
| 5,798,633 A | 8/1998 | Larsen et al. | |
| 6,232,742 B1 | 5/2001 | Wacknov et al. | |
| 6,275,403 B1 | 8/2001 | McNulty et al. | |
| 6,784,710 B2 | 8/2004 | Andersen et al. | |
| 6,950,323 B2 | 9/2005 | Achleitner et al. | |
| 7,148,650 B1 | 12/2006 | McNulty et al. | |
| 7,309,850 B2 | 12/2007 | Sinton et al. | |
| 8,625,315 B2 | 1/2014 | Erdman et al. | |

(Continued)

FOREIGN PATENT DOCUMENTS

| | | |
|---|---|---|
| AU | 2012282686 A1 | 1/2013 |
| CN | 201474941 U | 5/2010 |

(Continued)

OTHER PUBLICATIONS

Trishan Esram and Patrick L Chapman, "Comparison of Photovoltaic Array Maximum Power Point Tracking Techniques", IEEE Transactions on Energy Conversion, vol. 22, No. 2, Jun. 2007, pp. 439-449.

*Primary Examiner* — Karen Masih
(74) *Attorney, Agent, or Firm* — Myers Wolin, LLC (57) ABSTRACT

A method is provided for setting an operating parameter for a load on a photovoltaic power source, such as an AC signal or the speed of a motor, including operating a load, using a control system, with the operating parameter set at a first value, providing a measurement of DC source voltage at the power source to the control system, and providing a measurement of DC source current at the power source to the control system, determining the logarithm of the conductance from the measurement of DC source voltage and the measurement of DC source current, and comparing a reference parameter based on the logarithm of the conductance to a reference setpoint. Based on that comparison, the operating parameter may be modified for the load if the value of the reference parameter differs from the value of the reference setpoint by more than a threshold amount.

20 Claims, 3 Drawing Sheets

(56) References Cited

U.S. PATENT DOCUMENTS

| | | |
|---|---|---|
| 2005/0067999 A1 | 3/2005 | Okamura et al. |
| 2007/0290651 A1 | 12/2007 | McNulty |
| 2013/0181691 A1 | 7/2013 | Fukada |
| 2013/0286698 A1 | 10/2013 | Lee et al. |
| 2013/0327077 A1 | 12/2013 | Motsenbocker |
| 2013/0342017 A1 | 12/2013 | Lipan |
| 2014/0015325 A1 | 1/2014 | Ledenev et al. |
| 2014/0028104 A1 | 1/2014 | Makover |
| 2014/0035377 A1 | 2/2014 | Klein |

FOREIGN PATENT DOCUMENTS

| | | |
|---|---|---|
| CN | 201910767 U | 7/2011 |
| CN | 102148507 A | 8/2011 |
| CN | 102163067 A | 8/2011 |
| CN | 102289240 A | 12/2011 |
| CN | 102566646 A | 7/2012 |
| CN | 102611135 A | 7/2012 |
| CN | 1026611164 A | 7/2012 |
| CN | 102684544 A | 9/2012 |
| CN | 102799208 A | 11/2012 |
| CN | 102841628 A | 12/2012 |
| CN | 202597129 U | 12/2012 |
| CN | 103034250 A | 4/2013 |
| CN | 202888869 U | 4/2013 |
| CN | 203023074 U | 6/2013 |
| CN | 103207639 A | 7/2013 |
| CN | 203133654 U | 8/2013 |
| CN | 103744465 A | 4/2014 |
| JP | S60246423 A | 12/1985 |
| JP | S6152719 A | 3/1986 |
| JP | S6180315 A | 4/1986 |
| JP | S6293718 A | 4/1987 |
| JP | S6345616 A | 2/1988 |
| JP | S6348163 A | 2/1988 |
| JP | S63140668 A | 6/1988 |
| JP | H03206508 A | 9/1991 |
| JP | H06230838 A | 8/1994 |
| JP | H10191578 A | 7/1998 |
| JP | 2012185627 A | 9/2012 |
| JP | 5344042 B2 | 11/2013 |
| JP | 20130094796 A | 12/2013 |
| JP | 5412575 B2 | 2/2014 |
| KR | 100886891 B1 | 3/2009 |
| KR | 100989441 B1 | 10/2010 |
| KR | 20120044832 A | 11/2013 |
| RU | 2012137298 A | 3/2014 |
| TW | 201020712 A | 6/2010 |
| TW | 201339790 A | 10/2013 |

\* cited by examiner

SYSTEM AND METHOD FOR MAINTAINING A PHOTOVOLTAIC POWER SOURCE AT A MAXIMUM POWER POINT

FIELD OF THE INVENTION

The invention relates to a system and method for maintaining a photovoltaic power source at a maximum power point by controlling an operating parameter of a load connected thereto.

BACKGROUND

A photovoltaic (PV) power source, such as a solar cell array, may be used to drive an electric load, such as an electric motor. While photovoltaic cells are DC power sources, such a motor driven by the source may be either AC or DC. The use of solar panels, or solar cell arrays, to drive AC electric motors for water pumps or electrical generators, or for providing DC power directly to a battery, are common for off-grid locations, such as off-grid development projects, eco-friendly living and working spaces, and for desalinizing water, especially in remote locations.

Most electronic devices may be described by some parameters that stay constant within certain operating environments that cover almost the entire operating range of the device. This is not the case for solar cells. Most solar cells are described by their current, voltage, or power output at standard operating conditions, with an understanding that they will spend a large portion of their operation outside those conditions. This is because the amount of electrical power generated by a PV system depends on solar irradiance (or solar energy per unit area of the solar cell array surface) and may be affected by a variety of other factors, such as temperature. Further, the irradiance may suddenly change due to, for example, cloud cover.

Power can be stated as P=IV, where P is power, I is current and V is voltage. Accordingly, the possible output of a solar cell array in any given environment may be shown as an I-V curve to show the range of available voltages and corresponding current values if the system were to be operated at those voltages. The point of the curve at which P=IV is maximized, or the knee of the curve, represents that maximum power point, or MPP, at which the power source may be operated.

Figure 1:
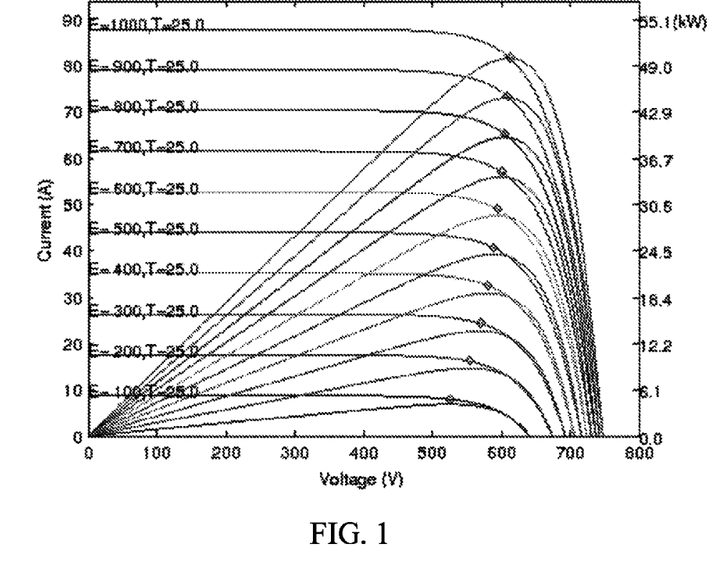
FIG. 1 shows I-V curves at a variety of irradiance values.

FIG. 1 shows I-V curves at different irradiance values. As shown, changes in the environment, such as occlusion of solar panels or otherwise lowering of available irradiance, can shift the I-V curve, replacing it with a different curve. Such a change typically results in a different voltage level that corresponds to the new MPP. Accordingly, an MPP tracking, or MPPT, system will attempt to determine the new maximum power point of the curve.

Accordingly, a number of parameters of both the solar cell array and the electric load are selected and tracked as part of an MPPT system in order to use available PV resources as efficiently and completely as possible. In such a system, both the power source and the electric motor may be exposed to conditions, such as environmental conditions, that require constant adjustments to both the power source and the load in order to maintain an efficient implementation of the system.

PV power systems are therefore typically paired with a control system to implement maximum power point tracking (MPPT) for the system. The location along the I-V curve at which the power source is operated may be determined by a load applied to the PV source, so that increasing a resistance in the load by, for example, modifying the frequency of a motor, may in turn increase the voltage output by the power source. A corresponding change in current will then keep the power output along the I-V curve.

MPPT systems are typically complex, require a wide array of sensors, and require substantial processing powers to operate. Further, MPPT systems may be slow due to their iterative nature, and typically require the comparison of multiple calculated metrics, further increasing the amount of processing required and may require additional time to calculate. Such time delays may detract from power that would otherwise be available to power the load, and such complexity may lead to expensive repairs and troubleshooting, as well as difficulty in implementation.

Further, many existing MPPT systems may be unable to discern between local maxima and global maxima for power, may oscillate around an MPP, or may converge inefficiently.

There is a need for a simple MPPT system and method that allow for accurate tracking of the maximum power point of a PV system without substantial processing or power overhead, and with a minimal number of discrete calculations.

SUMMARY

A method is provided for setting an operating parameter for a load on a photovoltaic power source, such as an AC signal or the speed of a motor, including operating a load, using a control system, with the operating parameter set at a first value, providing a measurement of DC source voltage at the power source to the control system, and providing a measurement of DC source current at the power source to the control system, determining the logarithm of the conductance from the measurement of DC source voltage and the measurement of DC source current, and comparing a reference parameter based on the logarithm of the conductance to a reference setpoint. Based on that comparison, the operating parameter may be modified for the load if the value of the reference parameter differs from the value of the reference setpoint by more than a threshold amount.

The operating parameter may be modified by providing instructions or a control signal indicating an amount to change the speed of a motor to a variable frequency drive.

This method may be performed repeatedly such that updated measurements of DC source voltage and DC source current at the power source are consistently provided to the control system, and an updated reference parameter is compared to the reference setpoint, and the operating parameter is modified incrementally so long as the reference parameter differs from the reference setpoint by more than the threshold amount.

In some embodiments, the reference parameter may be tracked across a plurality of cycles of the method and a rate of change of the measurement may be determined. The control system may then modify the reference parameter by a first amount when the rate of change is below a threshold, and by a second amount when the rate of change is above a threshold. In some embodiments, the control system is a fuzzy control system biased towards modifying the operating parameter in a first direction.

Further, the operating parameter may be adjusted in a first direction if the reference parameter is larger than the setpoint and in a second direction if the reference parameter is smaller than the setpoint.

The reference parameter may be defined as:

$$M_{adj} = \frac{G_m \bar{\mu}_{voc} T_r + V_m G_{mr} - V_m \Lambda \left( \frac{V_{mr}}{T_r} + \bar{\mu}_{voc} \right)}{(V_m + \bar{\mu}_{voc} T_r)}.$$

In some embodiments, a computer based method is provided for controlling a load on a photovoltaic power source, and the method comprises first setting an operating parameter of the load at a first value, receiving a measurement of DC source voltage at the power source, receiving a measurement of DC source current at the power source, determining the logarithm of the conductance from the measurement of DC source voltage and the measurement of DC source current, comparing a reference parameter based on the logarithm of the conductance to a reference setpoint; and modifying the operating parameter for the load if the value of the reference parameter differs from the value of the reference setpoint.

Such a method may be performed repeatedly for updating the operating parameter so long as the reference parameter differs from the reference setpoint by more than a threshold amount.

Photovoltaic power systems may further be provided for implementing the methods described, such power systems comprising photovoltaic power sources, loads driven by the power sources, and sensors configured to monitor Dc source voltage and source current at the power sources. Systems may further include irradiance sensors specifically to determine a start up point for the system.

Systems may further include sensors or other components for determining water demand or availability so that acquired information may be used to determine when a water pump utilizing such systems may minimize waste of solar power by avoiding operation when such operation would not provide a benefit.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A system and method are described for setting and maintaining an operating parameter for a load on a PV power source. The method as described is typically an ongoing process for continuously adjusting the operating parameter of the system in order to maintain the system at the MPP. Accordingly, the system and method will initially be described in terms of a single iteration within a control system, and will then be discussed as a broader operating method with a startup phase.

Figure 2:
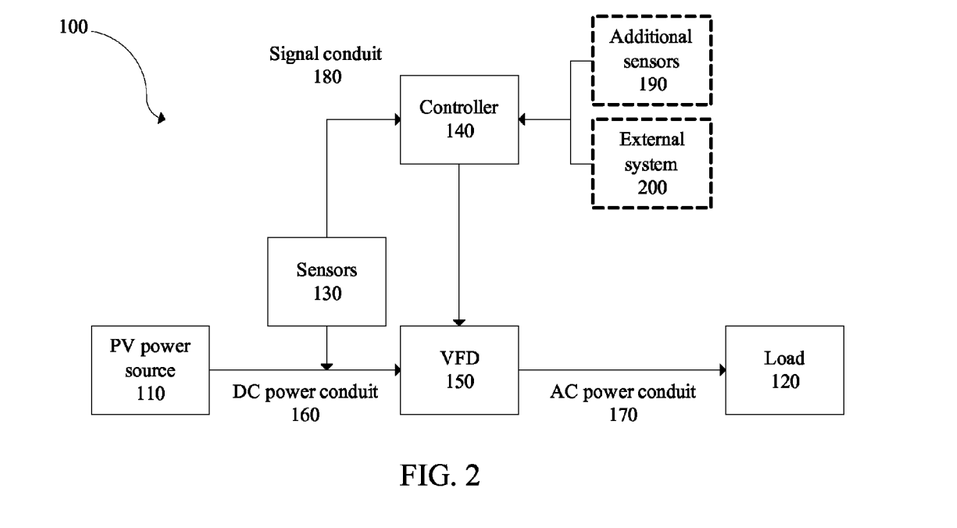
FIG. 2 is a block diagram of a system for maintaining a PV source at its maximum power point.
Figure 3:
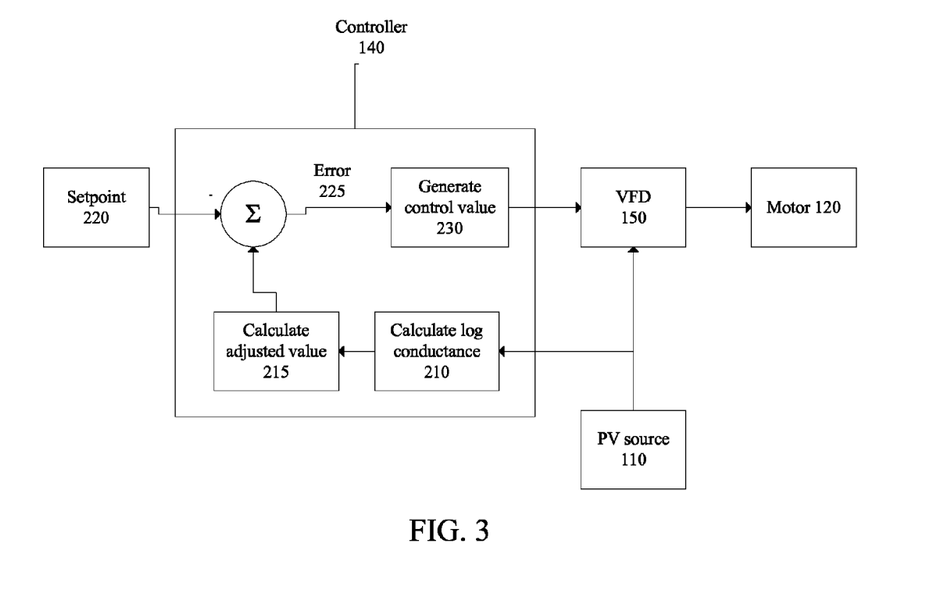
FIG. 3 is a schematic of an implementation of a maximum power point tracking system in the system of FIG. 2.

FIG. 2 shows a system 100 for setting an operating parameter and FIG. 3 shows a method that may be implemented by the system. The system typically comprises a PV power source 110, such as a set of solar panels or cells, a load 120 driven by the PV power source 110, such as a motor for operating a pump or a power generator, sensors 130 for detecting voltage and current at the PV power source 110, such as transducers, and a controller 140 for controlling at least one parameter of the load 120 based on information received from the sensors 130. The controller 140 may control the load by utilizing a variable frequency drive (VFD) 150, or such a controller 140 may be integrated into the VFD 150. In a typical embodiment, the controller 140 would be housed in a unit external to the VFD 150 and would transmit control signals to the VFD.

Typically while the system 100 is in operation, i.e., when the motor 120 is being driven by power from the solar panels 110, the system 100 will continuously operate the load 120, initially maintaining an operating parameter of the load 120 at a first value. The operating parameter of the load 120 is discussed in the following methods in terms of a frequency of an AC motor 120, controlled by the VFD 150, but it may be, for example, a parameter of a power inverter, DC-DC power converter, battery charge controller, or other component driven by the PV power source 110.

Typically DC power is provided by a DC power conduit 160 to the variable frequency drive 150, where it is converted to AC power and provided by an AC power conduit 170 to the AC motor 120. Transducers 130 fixed to the DC power conduit 160 then send a first signal to the controller 140 indicating the voltage on the DC power conduit 160 and a second signal indicating the current on the DC power conduit 160 using a signal conduit 180.

The controller 140 typically sends a frequency command to the variable frequency drive 150 to indicate the frequency at which the AC motor 120 should be operated, or to indicate a change in frequency that should be applied. In some embodiments, the variable frequency drive 150 also sends a signal to the controller 140 indicating the current speed of the AC motor 120.

The controller may receive additional information from additional sensors 190, such as sensors for determining local irradiance, temperature, or well or groundwater levels in the case of the use of the controller to drive a water pump. The controller may also receive additional information from an external system 200, such as a computerized platform providing information related to water demand levels in the case of a water pump.

As shown in FIG. 3, the PV source 110 is connected to the variable frequency drive 150 to provide power, while information about voltage and current are sent to a controller 140. The controller 140 first calculates 210 the log conductance Gm based on the voltage and the current provided. The controller may then calculate 215 an adjusted value M based on the log conductance $G_m$. This value is then compared to a setpoint 220 to determine an error value e 225.

This error value is then evaluated using a control logic 230, typically implemented using a fuzzy control system, and is used to generate a control value, which is then transmitted to the variable frequency drive 150. The drive 150 then drives the motor 120 at a frequency determined by the controller 140 and/or the variable frequency drive 150.

Typically, the quantity M is determined by first finding the logarithm of the conductance $G_m$, based on voltage and current data provided by transducers 130. Accordingly, $$G_m = \ln\frac{I_m}{V_m}.$$

$G_m$ is then used as part of an equation for finding a new quantity, M, which remains constant across a variety of values for irradiance E. The formula for M would then be:

$$M = G_m - \frac{\Lambda}{T}V_m = \ln\Lambda - \ln T + \ln I_0$$

Where $\Lambda$ is a coefficient which is constant to the particular solar setup and can be defined as $$\frac{q}{\gamma A k},$$

where q is charge≈$1.6\times10^{-19}$ Coulombs, k is Boltzmann's constant $1.38\times10^{-23}$, and γ is a coefficient that represents the proportion in ideality between recombination in the quasi-neutral region and recombination in the space-charge regions when both regions are represented as diodes, and A is the area of the diode. It is noted that this definition for $\Lambda$ holds for a single cell, while a Gaussian model, or some other mathematical model, may be used to aggregate the parameter for an array of cells.

Further, in the formula, T is the temperature (in Kelvin) and $I_0$ is the reverse saturation current.

The partial derivative of M taken with respect to irradiance E, $$\frac{\partial M}{\partial E},$$

is 0, indicating that the quantity M is constant with respect to changes in light. Accordingly, while highly dependent on the PV power source implementation, M is constant across the entire normal operating range of the system.

While the quantity M is constant with respect to irradiance, it may still vary with respect to temperature T. Accordingly, the formula may be further refined to provide an adjusted M quantity as follows:

$$M_{adj} = \frac{G_m\bar{\mu}_{voc}T_r + V_mG_{mr} - V_m\Lambda\left(\frac{V_{mr}}{T_r} + \bar{\mu}_{voc}\right)}{(V_m + \bar{\mu}_{voc}T_r)}$$

Because M, or $M_{adj}$, is constant for a PV power source implementation with respect to both temperature and irradiance, a setpoint for $M_{adj}$, $M_0$ may be used, and the controller may then attempt to bring the calculated value of M as close as possible to $M_0$ for the maximum power point of the system.

As shown in FIG. 3, the method may begin with the motor 120 already operating with a controlled operating parameter, such as the frequency of the motor, maintained at a first value (310).

The method may then first determine, at the transducers 130, the voltage (320) and the current (330) at the solar panels 110 and provide those values to the controller 140. The controller may then calculate (340) the logarithm of the conductance of the value by, for example, using the formula $$G_m = \ln\frac{I_m}{V_m},$$

and may then use that quantity, in combination with a hardware dependent quantity to calculate a real-time quantity for M, $M_{rt}$ (350).

In some embodiments, additional information may optionally be acquired from sensors integrated into the system prior to calculating M. For example, the system 100 may determine an environmental temperature, which may be used in a temperature dependent version of M.

The method then accesses (360) a reference parameter $M_0$ and compares (370) the calculated quantity $M_{rt}$ to the setpoint $M_0$. The reference parameter $M_0$ may be stored in a memory associated with the controller 140, or it may be received from an external database, or other storage. If the calculated quantity $M_{rt}$ is equal to, or within a threshold value of the setpoint $M_0$, the system 100 is at or near the maximum power point and the method ends. In some embodiments, when the method ends, it may set a timing mechanism to restart the method after a fixed amount of time. Accordingly, the system 100 may check that the maximum power point is maintained at regular time intervals.

If, however, the difference between $M_{rt}$ and $M_0$ is larger than a threshold amount, an error quantity e is calculated (380), and the method adjusts (390) the operating parameter of the load, i.e. the frequency of motor.

Typically, the adjustment of the frequency of the motor 120 is performed by transmitting a frequency command to the variable frequency drive 150, which in term modifies the frequency of the motor 120, as described above. In some embodiments, the controller 140 internally tracks the most recent frequency commands sent to the motor so that it may determine an appropriate frequency for the motor based on the error quantity e and the current speed of the motor 120. In other embodiments, the variable frequency drive 150 may provide frequency feedback to the controller so that the controller 140 is informed of the frequency of the motor 120 in real time.

In some embodiments, the controller 140 need not be aware of the current speed of the motor 120. In such implementations, the controller 140 may output an instruction to increase or decrease the frequency of the motor 120 to the variable frequency drive 150 based solely on the size and direction of the error quantity e.

As described in more detail below, with respect to the fuzzy controller, the change in frequency may depend on the size of the error quantity e. In some embodiments, it may also depend on the sign associated with the error quantity e so that, for example, the controller may respond more quickly to changes in a first direction, such as a decrease in light level, than changes in a second direction, such as an increase in light level.

After modifying the frequency of the motor, the method returns to step 320 and once again determines, using the transducers 130, the voltage (320) and current (330) at the solar panels 110. The method continues in this manner until the error quantity e is within an acceptable boundary.

In some embodiments, system parameters, which may depend on the solar installation, may be extracted. Typically, a sweep, or any other method may be used to calibrate the I-V curve.

In some embodiments, the system 100 retains, in a memory, earlier measurements and determines a rate of change in the measurements of $M_{rt}$. Such measurements may be utilized by the fuzzy controller implementation, as discussed in more detail below.

Figure 4:
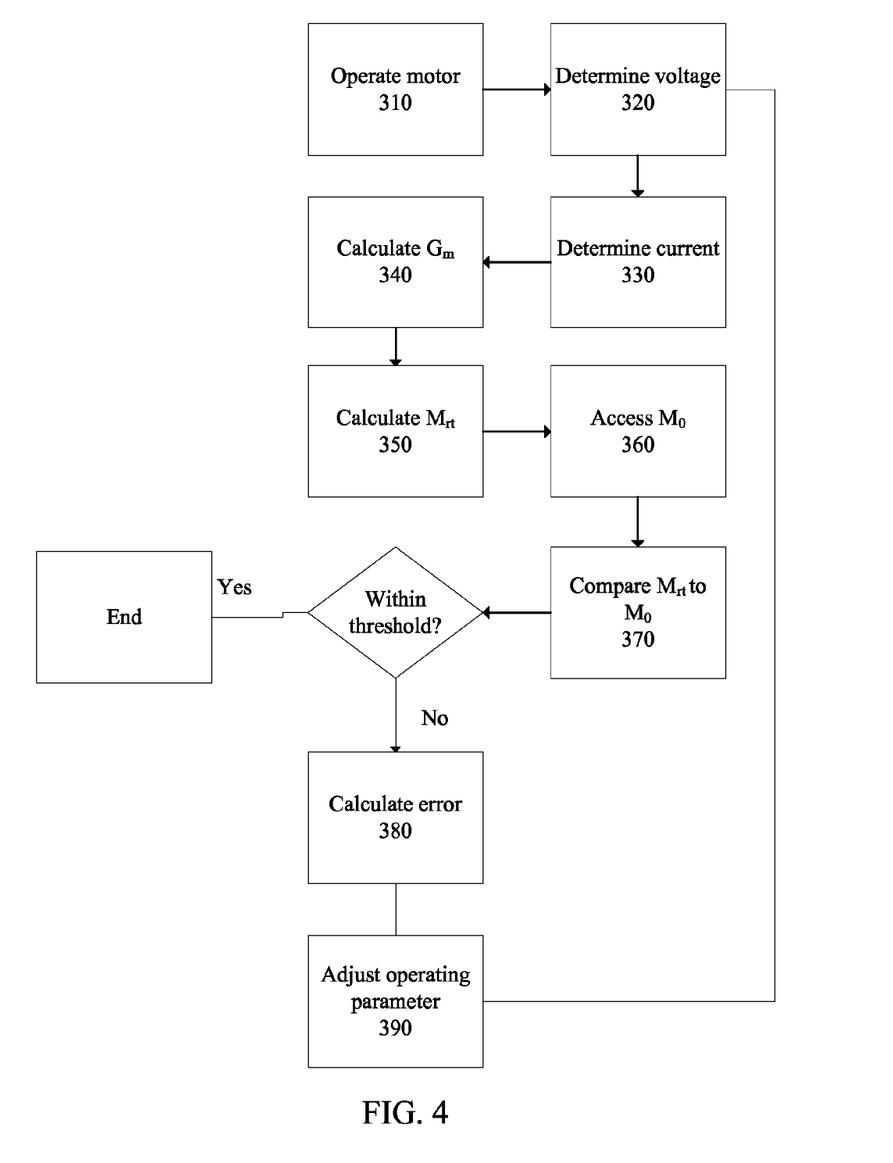
FIG. 4 is a flow chart illustrating an implementation of the method of FIG. 3.

Typically, implementations of the method described are state dependent. For example, the method of FIG. 4 may be implemented during normal operation. Such normal operation may incorporate a search state, utilizing the methods described above to obtain an appropriate operating parameter for the system in whatever conditions exist at the time. For example, during normal operation, a system implementing the method may transition to a search state at set intervals (e.g., every 15 minutes) and may then track the MPP and define the appropriate operating parameter for the system.

Similarly, additional methods may be used to implement a ramp up mode, where the motor 120 is quickly ramped up to a minimum viable frequency. During operation in some of these states, the system may employ fuzzy logic utilizing a fuzzy control system. In some embodiments, the transition between states is commanded by an operator, while in others it may be implemented by the controller 140 in response to sensor data. For example, the system may be transitioned to a ramp up state when enough irradiance is available to operate the motor 120, and the system may turn off when irradiance drops below a threshold or when a controller determines that the motor 120 is at risk of overheating.

Information from sensors 130, 190 or external systems 200 may trigger a state transition. For example, when an irradiance detector 190 reaches a threshold level, the system may transition to a ready state. Similarly, environmental temperatures, or component temperatures (such as engine temperatures) may trigger a state transition.

In a typical embodiment, the sensed variable quantities (i.e., source voltage and current) are used to calculate the quantity $M_{rt}$, and the controller 140 is provided with only the error quantity e described above and a corresponding sign. In such an embodiment, the output of the controller 140 may then be a signaled change in frequency, sent to the VFD 150. Such a fuzzy controller 140 might be biased towards fast drops in speed of the motor in the event of fast drops in conductance, such as where the sun is blocked by a cloud.

In some embodiments, the controller 140 may be provided with both the error quantity e and a change in the error quantity e over time. In such embodiments, the controller 140 may contain a memory for storing at least one prior error quantities, and may then signal a change in frequency, sent to the VFD 150, based on both the error e, including the corresponding sign, and the change in error e based on the most recent two error calculations.

Embodiments of the system and the operations described in this specification can be implemented in digital electronic circuitry, or in computer software, firmware, or hardware, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The term "computer system" or "computer-based method" as used in the specification and claims encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The block diagrams in the different depicted embodiments illustrate the architecture, functionality, and operation of some possible implementations of apparatus, methods and computer program products that might incorporate the system and method of the present disclosure. In this regard, each block in a flowchart or block diagram or an element of a website or the like may represent a module, segment, or portion of code, which comprises one or more executable instructions for implementing the specified function or functions. In some alternative implementations, the function or functions noted in a block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device. The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code for performing the method of the invention will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the present invention has been described at some length and with some particularity with respect to the several described embodiments, it is not intended that it should be limited to any such particulars or embodiments or any particular embodiment, but it is to be construed so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for setting an operating parameter for a load on a photovoltaic power source, the method comprising:
    operating a load, using a control system, with the operating parameter at a first value;
    providing a measurement of DC source voltage at the power source to the control system;
    providing a measurement of DC source current at the power source to the control system;
    determining, at the control system, the logarithm of the conductance from the measurement of DC source voltage and the measurement of DC source current;
    comparing a reference parameter based on the logarithm of the conductance to a reference setpoint; and
    modifying the operating parameter for the load if the value of the reference parameter differs from the value of the reference setpoint by more than a threshold amount.

2. The method of claim 1 further comprising repeatedly providing updated measurements of DC source voltage and DC source current at the power source to the control system, determining the logarithm of the updated conductance from the measurements, comparing an updated reference parameter to the reference setpoint, and modifying the operating parameter so long as the reference parameter differs from the reference setpoint by more than the threshold amount.

3. The method of claim 2 further comprising tracking the reference parameter across a plurality of cycles of the method and determining a rate of change of the measurement, wherein the control system modifies the reference parameter by a first amount when the rate of change is below a threshold, and by a second amount when the rate of change is above a threshold.

4. The method of claim 2 wherein the control system is a fuzzy control system biased towards modifying the operating parameter in a first direction.

5. The method of claim 2 wherein the operating parameter is adjusted in a first direction if the reference parameter is larger than the setpoint and is adjusted in a second direction if the reference parameter is smaller than the setpoint.

6. The method of claim 1 wherein the reference parameter is $$M_{adj} = \frac{G_m \bar{\mu}_{voc} T_r + V_m G_{mr} - V_m \Lambda \left( \frac{V_{mr}}{T_r} + \bar{\mu}_{voc} \right)}{(V_m + \bar{\mu}_{voc} T_r)}$$

wherein G is the logarithm of the conductance;
V is the voltage;
Λ is a coefficient based on a particular photovoltaic configuration;
T is temperature
and the subscript r indicates a reference condition, m indicates the maximum power point, and mr indicates the maximum power point for a reference condition.

7. The method of claim 1 wherein the operating parameter is an AC signal.

8. The method of claim 1 wherein the operating parameter is a speed of a motor.

9. The method of claim 8 wherein the control signal modifies the operating parameter by outputting an amount by which a variable speed drive will change the speed of the motor.

10. The method of claim 4 wherein the modification in the first direction is a result of a reduced conductance.

11. A computer based method for controlling a load on a photovoltaic power source, the method comprising:
    setting an operating parameter of the load at a first value;
    receiving, at a controller, a measurement of DC source voltage at the power source;
    receiving, at the controller, a measurement of DC source current at the power source;
    determining, at the controller, the logarithm of the conductance from the measurement of DC source voltage and the measurement of DC source current;
    comparing a reference parameter based on the logarithm of the conductance to a reference setpoint; and
    modifying the operating parameter for the load if the value of the reference parameter differs from the value of the reference setpoint.

12. The method of claim 11 further comprising repeatedly receiving updated measurements of DC source voltage and DC source current at the power source, determining an updated logarithm of the conductance from the measurements, comparing an updated reference parameter to the reference setpoint, and modifying the operating parameter so long as the reference parameter differs from the reference setpoint by more than a threshold amount.

13. The method of claim 11 wherein the operating parameter is adjusted in a first direction if the reference parameter is larger than the setpoint and is adjusted in a second direction if the reference parameter is smaller than the setpoint.

14. The method of claim 11 wherein the reference parameter is $$M_{adj} = \frac{G_m \bar{\mu}_{voc} T_r + V_m G_{mr} - V_m \Lambda \left( \frac{V_{mr}}{T_r} + \bar{\mu}_{voc} \right)}{(V_m + \bar{\mu}_{voc} T_r)}.$$

15. The method of claim 11 wherein the operating parameter is an AC signal.

16. The method of claim 11 wherein the operating parameter is a speed of a motor.

17. The method of claim 16 wherein the control signal modifies the operating parameter by outputting an amount by which a variable speed drive will change the speed of the motor.

18. A photovoltaic power system comprising:
    a photovoltaic power source;
    a load driven by the photovoltaic power source;

a first sensor configured to monitor DC source voltage at the power source;

a second sensor configured to monitor DC source current at the power source; and a controller for controlling the load, the controller configured to:

operate the load at a first value of an operating parameter;

receive, from the first sensor and the second sensor, measurements of DC source voltage and current at the power source;

determine the logarithm of the conductance from the measurement of DC source voltage and the measurement of DC source current;

compare a reference parameter based on the logarithm of the conductance to a reference setpoint; and modify the operating parameter for the load if the value of the reference parameter differs from the value of the reference setpoint.

19. The system of claim 18 wherein the reference parameter is $$M_{adj} = \frac{G_m \bar{\mu}_{voc} T_r + V_m G_{mr} - V_m \Lambda \left( \frac{V_{mr}}{T_r} + \bar{\mu}_{voc} \right)}{(V_m + \bar{\mu}_{voc} T_r)}$$

wherein G is the logarithm of the conductance;

V is the voltage;

$\Lambda$ is a coefficient based on a particular photovoltaic configuration;

T is temperature and the subscript r indicates a reference condition, m indicates the maximum power point, and mr indicates the maximum power point for a reference condition.

20. The system of claim 18 wherein the operating parameter is a speed of a motor.

* * * * *